(No Model.)
R. M. SPRAGUE & J. F. RUTTER.
BASKET TRUCK.
No. 523,244.  Patented July 17, 1894.
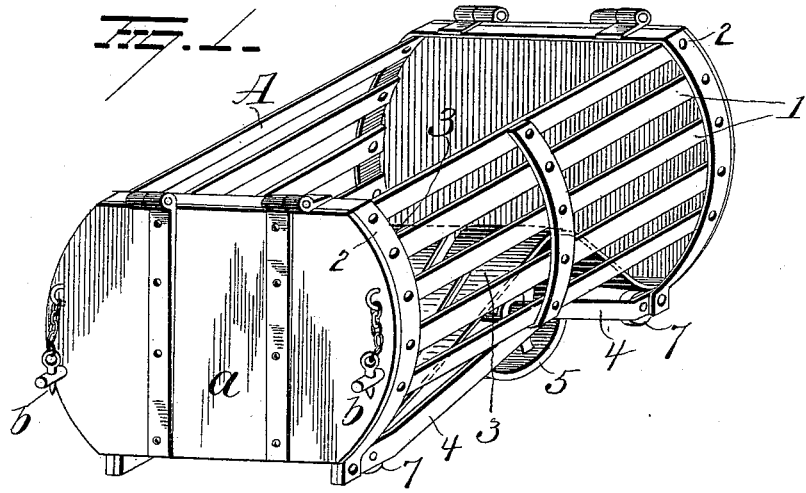
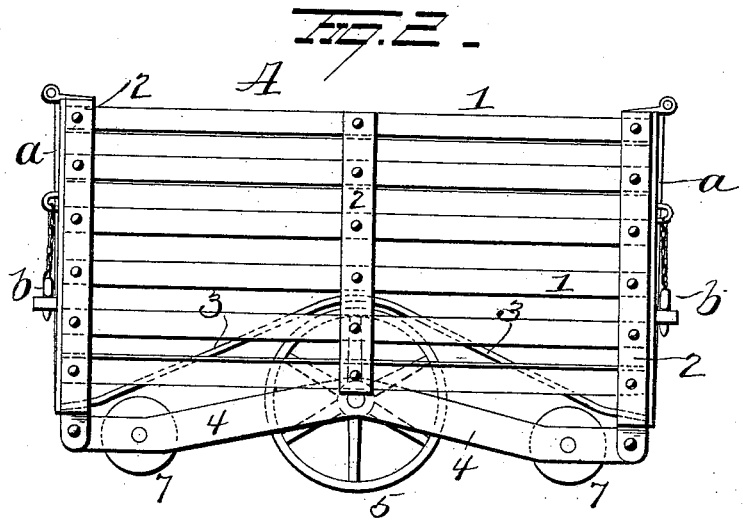
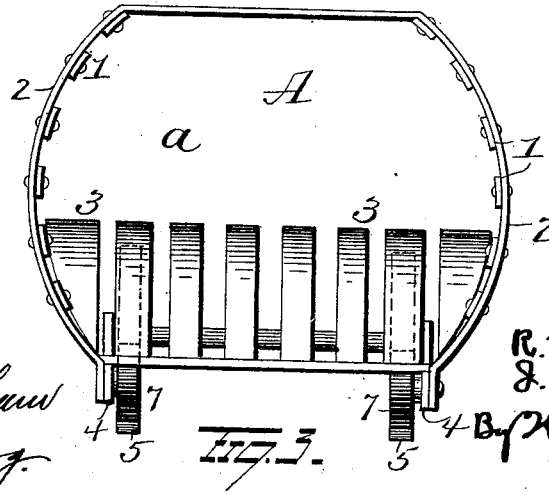
Witnesses
R. Nottingham
G. F. Downing
Inventors
R. M. Sprague
J. F. Rutter
By H. A. Seymour
Attorney

UNITED STATES PATENT OFFICE.

ROBERT M. SPRAGUE AND JOHN F. RUTTER, OF COUNCIL BLUFFS, IOWA, ASSIGNORS OF ONE-THIRD TO C. C. SPRAGUE, OF SAME PLACE.

BASKET-TRUCK.

SPECIFICATION forming part of Letters Patent No. 523,244, dated July 17, 1894.

Application filed March 20, 1894. Serial No. 504,436. (No model.)

*To all whom it may concern:*

Be it known that we, ROBERT M. SPRAGUE and JOHN F. RUTTER, of Council Bluffs, in the county of Pottawattamie and State of Iowa, have invented certain new and useful Improvements in Trucks; and we do hereby declare the following to be a full, clear, and exact description of the invention, such as will enable others skilled in the art to which it appertains to make and use the same.

Our invention relates to an improvement in trucks and more particularly to such as are adapted for use in connection with apparatus for processing or cooking canned goods,—the object of the invention being to produce a truck which shall be simple in construction and well adapted for holding canned goods while being treated in processing or cooking apparatus,—and to so construct said truck that its contents can be readily discharged by simply removing the pins which retain the ends thereof closed.

With these objects in view the invention consists in certain novel features of construction and combinations and arrangements of parts as hereinafter set forth and pointed out in the claims.

In the accompanying drawings: Figure 1 is a perspective view of our improved truck. Fig. 2 is a side view. Fig. 3 is a sectional view.

A represents our improved basket truck frame, which comprises a series of parallel bars or slats 1 secured to and united by means of straps 2 which are adapted to lie parallel with the interior wall of a shell or cylinder, the top of said truck being preferably flat so as to accommodate devices above it and the bottom 3 (composed of parallel slats or metal) of the truck is preferably made with a double incline for a purpose which will presently appear. Comparatively heavy inclined bars 4 are connected at their outer ends to the straps 2 at the ends of the truck and at their center support the axle of truck wheels 5, said wheels being adapted to run on suitable tracks and are covered by the double inclined floor 3. Smaller wheels 7 are mounted on suitable axles carried by the bars 4 in proximity to the ends thereof, said wheels 7 being disposed somewhat above the line of travel of the wheels 5 so that when the truck is not on the tracks above mentioned, it can be turned when desired, on the wheels 5, but when it is running in a straight line the smaller wheels 7 at one end of the truck can be made to run on the floor. The truck is provided at each end with a sheet iron door *a* hinged at the top of the truck and normally retained in a closed position by means of pins *b*. By providing the truck with these hinged doors and with a double inclined bottom as above explained, it will be seen that when the pins *b* are removed the weight of the contents of the truck will force said doors open and escape from the truck, the discharge of said contents being greatly facilitated by the inclined bottom 3.

Our improvements are very simple in construction, and effectual, in every respect, in the performance of their functions.

Various slight changes might be made in the details of construction of our invention without departing from the spirit thereof or limiting its scope and hence we do not wish to limit ourselves to the precise details of construction herein set forth; but, Having fully described our invention, what we claim as new, and desire to secure by Letters Patent, is—

1. A basket truck, the bottom of which inclines downwardly from the center in two directions, and provided with doors at the outer ends of the inclines, substantially as set forth.

2. A basket truck comprising a frame, said frame having a bottom which inclines downwardly from the center in two directions, and doors located at the outer ends of the inclines and hinged at their upper edges to the upper portions of the frame, substantially as set forth.

3. A basket truck comprising a series of spaced bars, wheels for supporting the body of the truck and hinged doors at the ends of the truck, substantially as set forth.

4. A basket truck comprising a series of spaced bars and an inclined bottom, and doors at the ends thereof, said doors being hinged at their upper ends to the body of the truck, substantially as set forth.

5. In a basket truck, the combination with a series of spaced bars, of straps for supporting said spaced bars, inclined bars at the bottom of the frame thus produced, an axle mounted in said last-mentioned bars, wheels on said axle, and an inclined bottom for the truck, over said wheels, substantially as set forth.

6. In a basket truck, the combination with an open frame, of main carrying wheels at the center thereof, and smaller wheels in proximity to the ends thereof, said smaller wheels being normally disposed above the line of travel of the main carrying wheels, substantially as set forth.

7. In a basket truck, the combination with a series of spaced bars, of straps for supporting said spaced bars, double inclined bars at the bottom of the frame thus produced, an axle supported at the upper portions of said double inclined bars, carrying wheels on said axle, and small wheels carried by said inclined bars in proximity to the ends of the truck, said small wheels being normally disposed above the line of travel of the main carrying wheels, substantially as set forth.

8. A basket truck having a wheel at the center in a lower horizontal plane than the wheel at the end whereby the truck may be rolled on the center wheel and made to tilt from a horizontal to an inclined position and a door at the end adapted to be opened to allow the contents of the truck to escape when the truck is in an inclined position, substantially as set forth.

9. A basket truck having a wheel at the center and wheels at each end in a higher plane than the plane of the center wheel whereby the truck can be rolled on the center wheel and tilted in either direction, and doors at each end of the truck either of which may be opened to allow the contents of the truck to escape in either direction, substantially as set forth.

In testimony whereof we have signed this specification in the presence of two subscribing witnesses.

ROBERT M. SPRAGUE.
JOHN F. RUTTER.

Witnesses:
  A. B. SMITH,
  W. H. ROGERS.